(12) United States Patent
Imaizumi et al.

(10) Patent No.: US 10,563,454 B2
(45) Date of Patent: Feb. 18, 2020

(54) HEAT-RAY-BLOCKING FLUORORESIN FILM

(71) Applicants:Toray Advanced Film Co., Ltd., Tokyo (JP); Toyocolor Co., Ltd., Tokyo (JP); Toyo Ink SC Holdings Co., Ltd., Tokyo (JP)

(72) Inventors: Kazuyuki Imaizumi, Takatsuki (JP); Yukio Noguchi, Takatsuki (JP); Atsushi Kimoto, Takatsuki (JP); Shinichi Tamura, Takatsuki (JP); Yoshihiro Kaneko, Tokyo (JP); Takashi Horiguchi, Tokyo (JP); Masayasu Kawamura, Tokyo (JP)

(73) Assignees: Toray Advanced Film Co., Ltd., Tokyo (JP); Toyo Ink SC Holdings Co., Ltd., Tokyo (JP); Toyocolor Co., Ltd., Tokyo (JP)

( * ) Notice: Subject to any disclaimer, the term of this patent is extended or adjusted under 35 U.S.C. 154(b) by 253 days.

(21) Appl. No.: 14/779,229

(22) PCT Filed: Mar. 18, 2014

(86) PCT No.: PCT/JP2014/057309
§ 371 (c)(1),
(2) Date: Sep. 22, 2015

(87) PCT Pub. No.: WO2014/156824
PCT Pub. Date: Oct. 2, 2014

(65) Prior Publication Data
US 2016/0047162 A1  Feb. 18, 2016

(30) Foreign Application Priority Data
Mar. 25, 2013  (JP) .................... 2013-061674

(51) Int. Cl.
*E06B 9/24*  (2006.01)
*C01F 7/00*  (2006.01)
(Continued)

(52) U.S. Cl.
CPC ............. *E06B 9/24* (2013.01); *C01F 7/005* (2013.01); *C08J 5/18* (2013.01); *C08K 3/22* (2013.01);
(Continued)

(58) Field of Classification Search
CPC ..... E06B 9/24; E06B 2009/2417; C08K 3/22; C08K 2003/2227; C08K 2003/2231;
(Continued)

(56) References Cited

U.S. PATENT DOCUMENTS 6,418,661 B1 * 7/2002 Takahashi ............ A01G 9/1438
252/587
2003/0138637 A1  7/2003 Aruga et al.
(Continued)

FOREIGN PATENT DOCUMENTS

JP  H4-46945 A  2/1992
JP  H9-205898 A  8/1997
(Continued)

OTHER PUBLICATIONS

JP2009-024145A translation (Year: 2009).*

*Primary Examiner* — Scott R. Walshon
*Assistant Examiner* — Jasper Saberi
(74) *Attorney, Agent, or Firm* — DLA Piper LLP (US)

(57) ABSTRACT

A heat-ray-blocking fluororesin film includes a heat-ray-blocking metal oxide and a hydrotalcite-type compound represented by Chemical Formula [1], wherein the content of the hydrotalcite-based compound is 0.03 to 1.0 wt %. The heat-ray-blocking fluororesin can exhibit excellent heat-ray-blocking performance while keeping the properties inherent (Continued)

in fluororesin films such as mechanical properties, transparency and long-term weatherability and is transparent and can be used out of doors for a long period of time, wherein $$Mg^{2+}{}_{1-a} \cdot Al^{3+}{}_{a}(OH^-)_2 \cdot AN^{n-}{}_{a/n} \cdot cH_2O$$

where $0.2 \leq a \leq 0.35$ and $0 \leq c \leq 1$; $AN^{n-}$ indicates n-valent anion.

11 Claims, 1 Drawing Sheet

(51) Int. Cl.
- *C09D 127/18* (2006.01)
- *C08J 5/18* (2006.01)
- *C08K 3/22* (2006.01)
- *C09D 127/12* (2006.01)
- *E04B 1/74* (2006.01)

(52) U.S. Cl.
CPC ......... *C09D 127/12* (2013.01); *C09D 127/18* (2013.01); *E04B 1/74* (2013.01); *C08J 2327/12* (2013.01); *C08K 2003/222* (2013.01); *C08K 2003/2217* (2013.01); *C08K 2003/2224* (2013.01); *C08K 2003/2227* (2013.01); *C08K 2003/2231* (2013.01); *C08K 2201/014* (2013.01); *E06B 2009/2417* (2013.01)

(58) Field of Classification Search
CPC ...... C08K 2003/2224; C08K 2003/222; C08K 2003/2217; C09D 127/12–20; C01F 7/005
See application file for complete search history.

(56) References Cited

U.S. PATENT DOCUMENTS

| | | | |
|---|---|---|---|
| 2006/0154049 A1* | 7/2006 | Padiyath | B32B 7/12 428/328 |
| 2007/0248803 A1* | 10/2007 | Kliesch | B29C 55/065 428/220 |
| 2011/0086209 A1* | 4/2011 | Katayama | A01G 9/1438 428/206 |
| 2012/0228539 A1* | 9/2012 | Honmyo | A01G 9/1438 252/62 |

FOREIGN PATENT DOCUMENTS

| | | | | |
|---|---|---|---|---|
| JP | 2001-171060 A | | 6/2001 | |
| JP | 2002-69258 A | | 3/2002 | |
| JP | 2003-176393 A | | 6/2003 | |
| JP | 2004-25586 A | | 1/2004 | |
| JP | 2006-124502 A | | 5/2006 | |
| JP | 2008-181838 A | | 8/2008 | |
| JP | 2009024145 A | * | 2/2009 | |
| JP | 2012-25809 A | | 2/2012 | |
| WO | WO-2013117957 A2 | * | 8/2013 | .............. C01F 7/005 |

* cited by examiner

HEAT-RAY-BLOCKING FLUORORESIN FILM

TECHNICAL FIELD

This disclosure relates to a heat-ray-blocking fluororesin film excellent in heat-ray blocking and weatherability. Specifically, it relates to a transparent fluororesin film excellent in heat-ray blocking and weatherability.

BACKGROUND

Fluororesin films have excellent weatherability, transparency, mechanical properties, moisture-proof property and, therefore, are used as a covering material for agricultural houses, roof film material, window material, solar battery surface protection material, light collection panel surfacing, display board surfacing, exterior building material and the like.

The sunlight can pass through them to illuminate rooms in the daytime without lamps. For environmental consciousness, the natural light illuminates interior showpieces with natural colors and the sky viewed from the interior provides a sense of openness so that they are greatly demanded particularly in the field of building material such as roof film and window materials.

On the other hand, the sunlight is sometimes harmful because of ultraviolet rays and infrared rays (heat rays). For example, strong irradiation of ultraviolet rays may cause dermatitis on a person and deteriorate synthetic substances. The infrared rays greatly irradiating into rooms may damage plants grown in the greenhouse and make a person uncomfortable with high temperatures.

To solve these problems, JP H09-205898 A discloses an infrared-ray-blocking agricultural sheet made of synthetic resin containing dispersed inorganic particles of tin oxide or the like. JP 2002-69258 A discloses a fluororesin film containing metal oxide particles coated with amorphous silica. JP 2004-25586 A discloses a heat-ray-blocking fluororesin composite sheet for roof materials containing infrared-ray-blocking inorganic particles on at least one surface.

JP 2001-171060 A discloses a colored or colorless transparent biaxially-oriented polyester film to be pasted on windows, containing near-infrared absorbent in the interlayer. JP 2008-181838 A discloses a transparent conductive laminate made by modifying the transparent color of transparent conductive membrane capable of blocking infrared rays including heat rays.

However, the agricultural sheet disclosed in JP H09-205898 A may have a poor see-through property and look dark because the inorganic particles chiefly consisting of tin oxide are contained at least 3 or 10 parts by weight in 100 parts by weight of synthetic resin so that visible light transmittance is poor although infrared rays including heat rays can be blocked. Further, long-term weatherability is hardly obtained because ultraviolet rays cause strength deterioration and fading even when an antifouling layer or antisweat layer is provided on the surface of composite resin containing polyethylene terephthalate-based resin, polyvinyl chloride resin or polyolefin resin as a base resin.

JP 2002-69258 A discloses a heat-ray-blocking fluororesin film containing composite particles having 95% distribution range of particle diameter of 0.1-30 μm dispersed in the fluororesin. The employed composite particles of metal oxide coated with amorphous silica have a large particle diameter (average particle diameter: 0.5-10 μm) and, therefore, the transparency may decrease and exhibit the particle color unnaturally when the particles contain enough to block heat rays.

JP 2004-25586 A discloses a composite sheet provided with a fluororesin layer containing near-infrared-blocking inorganic particles on at least one surface of reinforcing matrix. The employed reinforcing matrix made from a fiber woven fabric such as glass fiber woven fabric, polyamide-based fiber woven fabric and polyester-based fiber woven fabric, may have a poor see-through property with colored patterns of the fiber woven fabric.

JP 2001-171060 A suggests controlling sunlight transmittance by providing a three-layer coextrusion-laminated polyester film with an interlayer of polyester resin containing a near-infrared absorbent such as immonium-based compound, phthalocyanine-based compound, aluminum compound and polymethine compound, with visible light transmittance of 70-90% and haze of 5.0% or less. Even by such a method, transmitted light may be colored with the near-infrared absorbent to decrease visible light transmittance. Even a colored film provided with an interlayer containing a near-infrared absorbent and dye having absorbance in the visible ray region may have a further decreased visible light transmittance. Further, the base resin is polyester and, therefore, long-term weatherability is hardly obtained because of deterioration by ultraviolet rays.

JP 2008-181838 A discloses a transparent conductive laminate having a neutral color without yellowish ITO (indium tin oxide) transmission color made by laminating a specific refractive index material and a transparent conductive membrane made of ITO in this order on a transparent substrate. That method makes the transparent conductive membrane (ITO) as the outermost layer so that exterior long-term weatherability may be poor while bending resistance and abrasion resistance may be poor as an inherent problem of the thin-film laminate. Further, it may cost a lot to form the transparent conductive membrane (ITO) by a method such as vacuum deposition method, sputtering method and CVD method, because the processing is complicated.

Furthermore, there may be a problem that the heat-ray-blocking metal oxide typified by ITO added to fluororesin may have a poorer heat-ray blocking ability relative to the initial blocking over an exterior long-term use. As well, long-term weatherability over 3 years of exterior exposure may be poor.

It could therefore be helpful to provide a transparent heat-ray-blocking fluororesin which is excellent in heat-ray blocking while keeping fluororesin film characteristics such as transparency, mechanical properties and long-term weatherability capable of being used exteriorly in the long term. In the specification, the term "heat-ray blocking" means a functionality to totally (or partially) reflect (or absorb) a ray classified to infrared rays so that the ray is prevented from transmitting completely or partially.

SUMMARY

We thus provide:

(1) A heat-ray-blocking fluororesin film comprising a heat-ray-blocking metal oxide and a hydrotalcite-based compound having Chemical Formula [1], characterized in that a content of the hydrotalcite-based compound is 0.03 to 1.0 wt %:

$$Mg^{2+}{}_{1-a} \cdot Al^{3+}{}_{a}(OH^-)_2 \cdot AN^{n-}{}_{a/n} \cdot cH_2O \qquad [1]$$

where $0.2 \leq a \leq 0.35$ and $0 \leq c \leq 1$; $AN^{n-}$ indicates n-valent anion.

(2) The heat-ray-blocking fluororesin film according to (1), wherein the heat-ray-blocking metal oxide has an average particle diameter of 5 to 100 nm and content A [wt %] to satisfy a relation of Formula (1) with a film thickness t [μm]:

$$1/t \leq A \leq 200/t \quad (1).$$

(3) The heat-ray-blocking fluororesin film according to (1) or (2), wherein the hydrotalcite-based compound has an average particle diameter of 10 to 900 nm.

(4) The heat-ray-blocking fluororesin film according to any one of (1) to (3), wherein the film thickness t is 10 to 500 μm while a light transmittance $T_{IR}$ [%] in wavelength 1,800 to 2,200 nm satisfies a relation of Formula (2):

$$20 \leq T_{IR} \leq 70 \quad (2).$$

(5) The heat-ray-blocking fluororesin film according to any one of (1) to (4), wherein the heat-ray-blocking metal oxide is an indium tin oxide.

We provide a heat-ray-blocking fluororesin film which is transparent and excellent in long-term weatherability, capable of controlling harmful-light transmittance as keeping inherent fluororesin film characteristics such as transparency, mechanical properties and weatherability.

EXPLANATION OF SYMBOLS

1: black box
2: infrared ray lamp
3: temperature detector
4: film holder
5: film to be measured
6: thermograph

DETAILED DESCRIPTION

A heat-ray-blocking fluororesin film may be made of resin such as fluoro-olefin homopolymer, copolymer of two or more kinds of fluoro-olefin and copolymer of one or more kinds of fluoro-olefin with another monomer.

The fluoro-olefin is a monomer having polymeric unsaturated bond and fluorine atom and may have hydrogen atom, chlorine atom, oxygen atom. The fluoro-olefin may be tetrafluoroethylene, fluorinated vinyl, vinylidene fluoride, perfluoroalkyl vinyl ether, chloro-trifluoro-ethylene, hexafluoropropylene or the like. Another monomer is preferably a non-fluorine-based monomer and may be an olefin such as ethylene, propylene, butene and norbornene, an alkenyl ether such as cyclohexyl methyl vinyl ether, isobutyl vinyl ether, cyclohexyl vinyl ether, ethyl vinyl ether and ethyl allyl ether, an alkenyl ester such as vinyl acetate, vinyl pivalate and allyl pivalate or the like.

The fluororesin may be polytetrafluoroethylene (PTFE), tetrafluoroethylene hexafluoropropylene-based copolymer (FEP), tetrafluoroethylene propylene-based copolymer, ethylene tetrafluoroethylene-based copolymer (ETFE), tetrafluoroethylene hexafluoropropylene ethylene-based copolymer, a tetrafluoroethylene perfluoroalkyl vinyl ether-based copolymer such as tetrafluoroethylene perfluoropropyl vinyl ether copolymer (PFA), polyvinylidene fluoride (PVDF), vinylidene fluoride hexafluoropropylene-based copolymer, vinylidene fluoride tetrafluoroethylene hexafluoropropylene-based copolymer, polyvinyl fluoride (PVF), polychlorotrifluoroethylene (PCTFE), ethylene chlorotrifluoroethylene-based copolymer (ECTFE) or the like. Even a mixture thereof or a fluororesin primarily consisting thereof can be employed.

As needed, the fluororesin may contain thermoplastic resins or additives that have no fluorine so long as the characteristics of the fluororesin are not spoiled. The thermoplastic resin may be olefin-based resin, acryl-based resin, ester-based resin, amide-based resin or the like. The additive may be pigment (other than a blue pigment described later), dye, organic or inorganic particles (other than indium tin oxide described later), filler, dispersant, plasticizer or the like.

To apply the fluororesin film to a covering material for agricultural houses or a roof film material, it is preferable that the fluororesin is a resin primarily consisting of ETFE, FEP, PVF, PVDF or PVDF, from the viewpoints of film formation, transparency, handling and costs. Above all, it is preferably an ETFE resin.

The heat-ray-blocking metal oxide may be a metal oxide particle having a high visible light transmittance and characteristics of near-infrared ray absorbance or reflection. Specifically, it may be indium tin oxide (ITO; tin-doped indium oxide), antimony tin oxide (ATO; antimony-doped tin oxide), indium oxide, tin oxide, zinc oxide or the like. Above all, it is preferably indium tin oxide (ITO) which is an inorganic compound made from indium oxide and tin oxide, having an optical transmittance in the visible ray field and a conductivity derived from its electric charge density. It is often applied to a transparent electrode with such characteristics. Such an electrode has been applied to liquid crystal display, plasma display, touch panel screen, electronic ink for electronic papers, organic electroluminescence electrode, solar battery, antistatic agent, electromagnetic shielding material or the like.

In this example, the ITO is formed as particles. The ITO particles can be prepared by a powder sintering method in which indium oxide powder and tin oxide powder are pressed to form a shape to be sintered. Alternatively, it can be prepared by a method in which a solution containing indium salt and tin salt is neutralized to obtain a coprecipitate to be filtered, washed, dried and then sintered. Such a particle having an average particle diameter of 100 nm or less can be prepared industrially.

The ITO particles in fluororesin film have an average particle diameter of 5-100 nm. The diameter of more than 100 nm may have a poor light transmittance, coloration or increased haze so that it may not be suitable as a transparent membrane material from a viewpoint of visibility. The diameter of less than 5 nm may have insufficient ray-blocking efficiency and extremely poor yield derived from complicated industrial production.

Indium oxide and tin oxide can industrially be mixed by an appropriate proportion. Commercially-available products have proportion of [Indium oxide:Tin oxide=95:5 (wt % proportion; same as follows)]. From a viewpoint of balancing transparency and heat-ray blocking, various proportions from 85:15 to 97:3 available can be employed. For applications to transparent roof film or materials for windows and walls, great amount of indium oxide is required. Therefore, it is preferable to employ products having proportion of [Indium oxide:Tin oxide=95:5], which are stably distributed commercially.

Preferable content A [wt %] of heat-ray-blocking metal oxide of the fluororesin film is shown in Formula (1) with film thickness t [μm]. The heat-ray-blocking effect depends on the content of heat-ray-blocking metal oxide present per film unit area in depth direction so that thicker film can achieve a good effect even with lower content.

$$1/t \leq A \leq 200/t \tag{1}$$

The content A of less than 1/t may have insufficient heat-ray-blocking effect. The content A of more than 200/t may exhibit a strong color unique to heat-ray-blocking metal oxide so that the haze increases to extremely deteriorate transparency.

A hydrotalcite-based compound having Chemical Formula [1] and calcination product thereof are layer-shaped compounds having interlayer ion exchange ability and neutralization reactivity with acids. The calcination product can achieve a higher capture effect of acids and water than the layer-shaped compounds before calcination having Chemical Formula [1]. The calcination product can be prepared by heat processing the layer-shaped compounds before calcination at 200° C. to 800° C., preferably 250° C. to 700° C. The heat processing is performed for a time such as 1 to 24 hours and preferably 2 to 10 hours, as being adjusted according to the heat processing temperature. The heat processing may be performed in an atmosphere such as oxidative atmosphere and non-oxidative atmosphere. Hydrogen gas may be harmful because of its strong reduction action.

$$Mg^{2+}{}_{1-a} \cdot Al^{3+}{}_a(OH^-)_2 \cdot AN^{n-}{}_{a/n} \cdot cH_2O \tag{1}$$

where $0.2 \leq a \leq 0.35$ and $0 \leq c \leq 1$; $AN^{n-}$ indicates n-valent anion.

In Chemical Formula [1], it is important that the content a of Al is $0.2 \leq a \leq 0.35$. A content a of less than 0.2 may make it difficult to prepare a layer-shaped composite metal compound. A content a of more than 0.35 may have a refractive index greatly different from fluororesin to deteriorate transparency. Water content c preferably satisfies $[0 \leq c \leq 1]$. Anion $AN^{n-}{}_{a/n}$ may be hydroxyl ion, carbonate ion, silicate ion, phosphate ion, organic carboxylic ion, organic sulfonate ion, organic phosphate ion or the like. A content a in Chemical Formula [1] has been determined by analyzing the layer-shaped metal oxide dissolved in an acid with a plasma emission spectrometry analyzer (SPS4000 made by Seiko Instruments Inc.).

It is preferable that the hydrotalcite-based compound has a BET specific surface area of 5 to 200 m²/g. The specific surface area of 5 m²/g or more can exhibit a good function such as acid capture efficiency. The specific surface area of 200 m²/g or less can improve dispersion to fluororesin.

The hydrotalcite-based compound has an average particle diameter of 10 to 900 nm. The average particle diameter of more than 900 nm may have a poor light transmittance and an excessive haze as well as an insufficient acid capture. The average particle diameter of less than 10 nm may make it difficult to industrially produce the layer-shaped composite metal oxide.

The hydrotalcite-based compound has a content of 0.03 to 1.0 wt % in fluororesin film. The content of more than 1.0 wt % may have a poor light transmittance and excessive haze, as well as strong color unsuitable as a transparent membrane material from a viewpoint of visibility. The content of less than 0.03 wt % may make it difficult to maintain long-term heat-ray blocking.

The film may have a thickness of 10-500 μm, preferably 20-300 μm, although not limited thereto as depending on applications. The thickness of less than 10 μm may not have a strength enough to be handled appropriately. The thickness of more than 500 μm may have a poor transparency as well as a heavy weight to make the handling ability worse.

If the heat-ray-blocking effect is only considered, it would have been desirable that the fluororesin film has 0 of light transmittance ($T_{IR}$) [%] in wavelength 1800-2200 nm as even considering the relation to near-infrared light transmittance. To also achieve a natural see-through property as a purpose of our films, it is actually preferable that the $T_{IR}$ satisfies Formula (2)

$$20 \leq T_{IR} \leq 70 \tag{2}$$

The $T_{IR}$ of 20% or more can achieve a visibility within approximately 30 meters through the film by adding required indium oxide. The $T_{IR}$ of 70% or less can achieve a practically required heat-ray blocking.

The heat-ray-blocking metal oxide and hydrotalcite-based compound can be mixed in the fluororesin film by a general method in which the heat-ray-blocking metal oxide and hydrotalcite-based compound are separately dispersed in the fluororesin or the like to prepare a composition each called "heat-ray-blocking metal oxide master" and "hydrotalcite-based compound master". Each of the heat-ray-blocking metal oxide master and hydrotalcite-based compound master is mixed to the fluororesin by a predetermined concentration to form a film. Although it is possible that the heat-ray-blocking metal oxide particles are mixed with the hydrotalcite-based compound before being dispersed in the fluororesin or the like, it is preferable that each master is separately dispersed from the viewpoints of dispersion condition and flexible concentration. It is preferable that the masters are formed in a pellet shape for easy conveyance to film formation device. The pellet preferably has almost the same size as a base resin of the fluororesin film.

It is preferable that the heat-ray-blocking metal oxide particles or/and the hydrotalcite-based compound are dispersed in a fluorine-based resin or the same resin as the base resin of the fluororesin film. From the viewpoints of dispersion of particles, affinity with particles and economy, it is possible that a resin has a molecular chain containing no fluorine. From the viewpoints of transparency and surface unevenness, it is preferable to employ a resin compatible with a base resin of the fluororesin film.

The heat-ray-blocking metal oxide particles or/and the hydrotalcite-based compound may be dispersed by a method to melt-knead the heat-ray-blocking metal oxide particles or/and the hydrotalcite-based compound with a resin. Alternatively, they may be dispersed by a method to remove dispersion medium while melt-kneading the resin with dispersion liquid of the heat-ray-blocking metal oxide particles or/and the hydrotalcite-based compound, or a method to remove solvent after dispersing the heat-ray-blocking metal oxide particles or/and the hydrotalcite-based compound in resin liquid, or the like. In those methods, it is preferable that the resin to be a binder is mixed as a powder having a great surface area. The heat-ray blocking metal oxide particles or/and the hydrotalcite-based compound may be melt-kneaded with a resin by a method in which a powdered resin and powder-like particles are blended by tumbler, ribbon blender, Nauta mixer, Henschel mixer, planetary mixer or the like and then melt-kneaded with a single-screw or twin-screw extruder with or without a vent to prepare a master pellet by cutting extruded strand. Alternatively, it is possible that the powdered resin and powder-like particles are primarily blended by a high-shear type kneading device such as hermetic internal mixer, kneader, calendar roller and heating kneader to prepare a resin composition, which is blended with the same or different kind of resin to prepare a master pellet. Although a dispersant or stabilizer can be added as needed, they should have sufficient chemical resistance and heat resistance at the kneading temperature and film formation temperature.

It is preferable that each particle master is a master chip containing particles dispersed by a concentration of 2-100 times as high as the concentration in the film. The higher concentration of the master chip, the more advantageous the dispersion processing cost is. A concentration of more than 100 times may not make a film containing particles uniformly dispersed in the base resin because of uneven distribution of the master chip.

The particle diameter of the heat-ray-blocking metal oxide and hydrotalcite-based compound in the fluororesin film can be determined by observing the section of the fluororesin film sliced by microtome with a transmission electron microscope.

This fluororesin film may consist of a single layer or may be a laminate film having at least one layer made of fluororesin. It is possible to give a design by painting a pattern or pasting a film with a printed pattern.

Although the film can be formed by a conventional method such as melt-extrusion film formation, calendar film formation and solution film formation, it is preferable to employ the melt-extrusion film formation method from the viewpoints of film thickness control, productivity, additive dispersion and the like. Although the film may be non-oriented, uniaxially-oriented or biaxially-oriented, it is preferable to employ the non-oriented film because of its dimension stability, transparency and easy film formation.

If the see-through property is only considered, it would have been desirable that the heat-ray-blocking fluororesin film has 100% of light transmittance Tv [%] in wavelength 380-700 nm. However, it is actually preferable that the Tv satisfies Formula (3) to achieve a natural see-through property because the fluororesin film cannot be prevented from absorbing or reflecting transmitted rays. The Tv of 85% or more can achieve excellent light transmittance $$85 \leq Tv \leq 98 \quad (3).$$

An optically colorless fluororesin film is supposed to have a yellowness YI of ±0. It is preferable that the YI satisfies Formula (4) to have a natural colored transmitted light. The YI of less than the range shown in Formula (4) may not have a natural colored transmitted light because of strong blue color.

$$-0.01t \leq YI \leq 0.03t \quad (4)$$

where t indicates film thickness [μm].

The ITO powder exhibits a color from yellow to gray. When it is dispersed in resin it looks transparent, but exhibits a powder color from yellow to gray when it is lit. To exhibit a natural see-through property, a blue pigment can be added.

The blue pigment means an inorganic or organic compound that exhibits a blue color under sunlight and may be an inorganic pigment such as cobalt-based and manganese-based or organic pigment such as indigo-based, phthalocyanine-based and anthraquinone-based. From the viewpoints of handling ability and coloring when added to the fluororesin, it is preferable to employ the cobalt-based pigment or phthalocyanine-based pigment. From the viewpoints of heat resistance, weatherability and reduction of yellowness when the ITO is added, it is preferable to employ the cobalt-based pigment, preferably cobalt blue.

The cobalt blue is also called PIGMENT BLUE 28. The composition formula is $CoAl_2O_4$ (cobalt aluminate) or $CoO.Al_2O_3$ (spinel type crystal of cobalt oxide and aluminum oxide). It is excellent in light resistance, weatherability, acid resistance and alkali resistance, and exhibits a stable color even in a process to add to fluororesin, even through a long-term exterior exposure of the film.

There is an organic metal-based blue pigment called "phthalocyanine blue" which has almost the same yellowness suppression ability as inorganic pigments. However, the cobalt blue is preferably added to the fluororesin, from the viewpoints of heat resistance, weatherability and broader range of application.

The blue pigment contained in the fluororesin film should have an average particle diameter of 10 to 200 nm. The average particle diameter of less than 10 nm may not have a light scattering enough to exhibit a blue color to transmitted light through the fluororesin film and therefore may not function as a blue pigment. The average particle diameter of more than 200 nm may have a poor light transmittance and excessive haze and be unsuitable as a transparent membrane material from a viewpoint of visibility.

Desirable blue pigment content B [wt %] depends on ITO content A [wt %] added as a heat-ray-blocking metal oxide, as shown in Formula (5). The blue pigment content can be adjusted according to the ITO content to make the fluororesin film colorless, while the YI level can be approached to ±0 to reduce the yellowness $$0.05A \leq B \leq 0.3A \quad (5).$$

The fluororesin film can be subject to atomic absorption (ICP) analysis to determine the contents of the heat-ray-blocking metal oxide, hydrotalcite-based compound and the blue pigment, which can also be determined from the ash content with weight conversion.

To adjust the color design with light transmitted through the heat-ray-blocking fluororesin film, it is possible that a conventional pigment other than the blue pigment is employed.

EXAMPLES

Hereinafter, our films will be explained with Examples which do not limit the scope of our films or this disclosure.

Each characteristic is evaluated by the following measurement method:

(1) Light Transmittance Tv [%] in Wavelength 380-700 nm

Light transmittance Tv [%] in wavelength 380-700 nm is continuously measured by a double-beam direct optical ratio measurement with a spectrophotometer U-2001 (made by Hitachi High-Technologies Corporation) to obtain each transmittance (Tvi) every 1 nm wavelength. The summation of each Tvi expressed in percentage is divided by the number (n) of measurement points to calculate light transmittance Tv [%] in 380-700 nm. The light transmittance Tv [%] may be called a visible light transmittance by its nature.

(2) Light Transmittance $T_{IR}$ [%] in Wavelength 1,800-2,200 nm

Light transmittance $T_{IR}$ [%] in wavelength 1,800-2,200 nm is continuously measured by a double-beam direct optical ratio measurement with a spectrophotometer U-4100 (made by Hitachi High-Technologies Corporation) to obtain each transmittance ($T_{IR}i$) every 1 nm wavelength. The summation of each $T_{IR}i$ expressed in percentage is divided by the number (n) of measurement points to calculate light transmittance $T_{IR}$ [%] in wavelength 1,800-2,200 nm. The light transmittance $T_{IR}$ [%] may be called a near-infrared light transmittance by its nature. It has a relation in inverse proportion to the following heat-ray-blocking efficiency as shown in Table 1.

(3) Heat-Ray-Blocking Efficiency [%]

Figure 1:
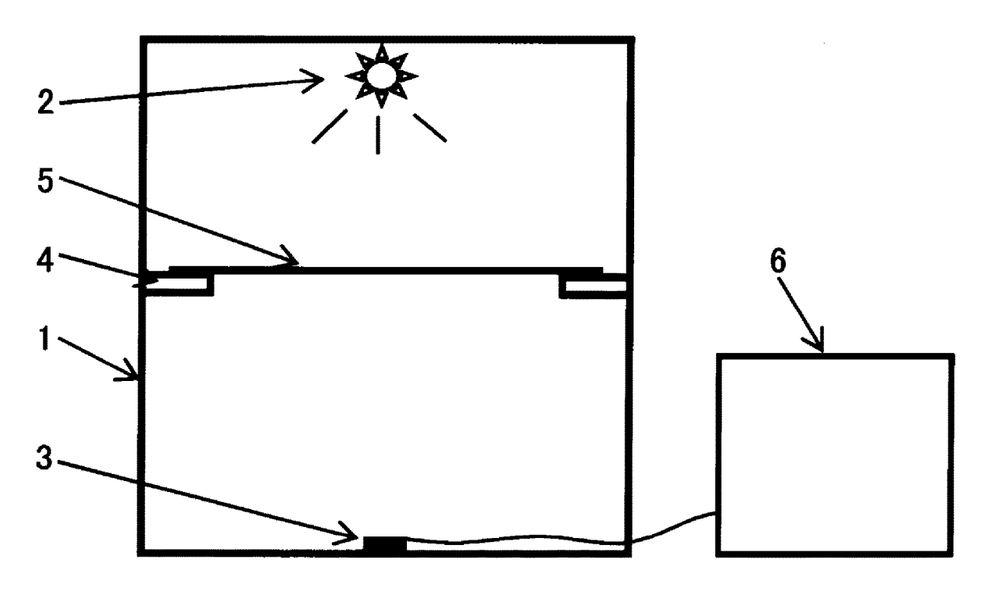
FIG. 1 is a schematic diagram of a heat-ray-cutting tester to determine film characteristics of an example of heat-ray-blocking fluororesin film.

A heat-ray-blocking efficiency is determined with a heat-ray-cutting evaluation tester shown in FIG. 1, in which a cubic black box having black panels with each side of 30 cm is provided with an incandescent lamp of 100 W in the center on the top of the box, a sensor (temperature detector) temperature in the center on the bottom, and a film holder at the middle height.

The heat-ray-cutting evaluation tester is placed in a room controlled at 23° C. A film to be measured is horizontally set with the film holder in the black box. Bottom temperature Ti [° C.] is detected and recorded with the temperature detector 20 minutes after starting the irradiation with the incandescent lamp. To compare the temperature differential ratio as a heat-ray-blocking efficiency, bottom temperature Tb [° C.] is detected without the film set with the film holder. On the basis of the threshold that the human body can feel a heat and cold difference through the film immediately, it is preferable that the heat-ray-blocking efficiency defined by Formula (6) is 20% or more $$\text{Heat-ray-blocking efficiency [\%]}=100\times(Tb-Ti)/(Tb-23) \quad (6).$$

(4) Particle Diameter

The fluororesin film containing the particles of the heat-ray-blocking metal oxide, the hydrotalcite-based compound and the blue pigment particles is sliced perpendicularly to the film surface into an ultrathin section having a thickness of 0.1 μm or less to be observed by measurement magnitude of 200,000 times or more with a transmission electron microscope (JEM-1200EX or the like; made by JEOL Ltd.). In a field of view observed, 50 particles are randomly selected to measure major axes regarded as diameters and averaged to obtain an average particle diameter.

(5) BET Specific Surface Area

It can be calculated with an adsorption isotherm based on so-called BET theory from adsorption gas quantity [cm$^3$/g] determined by a gas adsorption method according to JIS Z8830:2001 (corresponding international standard: ISO 9277:2010) with particles collected by a method according to JIS Z8833 (corresponding international standard: ISO 14488:2007). It is actually possible that the adsorption gas quantity is determined by static volumetric method, continuous volumetric method and weight method, according to a specific surface area measurement device. For example, BELSORP-mini II made by BEL JAPAN, Inc. provides the static volumetric method while Gemini V2390 made by Shimadzu Corporation provides the continuous volumetric method. In the specification, the BET specific surface area is determined by the static volumetric method.

(6) Weatherability Test

An accelerated weathering test is performed with Sunshine weather meter made by Suga Test Instruments Co., Ltd. according to JIS K7363 (corresponding international standard: ISO 9370:1997) to evaluate each transmittance and heat-ray blocking of films 2,000 hours later.

Example 1

(1) Preparation of ITO Dispersion Fluororesin (ITO Master A1)

A mixture of indium tin oxide (ITO) powder of average particle diameter 30 nm and powdered ethylene tetrafluoroethylene copolymer ("NEOFLON (registered trademark)" ETFE EP-526 made by Daikin Industries, Ltd.) was melt-kneaded with a hermetic internal mixer such as Banbury mixer to obtain a composition containing ITO of 20 wt %. Next, the composition and pellets (ETFE pellets) of ethylene tetrafluoroethylene copolymer ("NEOFLON (registered trademark)" ETFE EP-546 made by Daikin Industries, Ltd.) were blended to contain indium oxide of 5 wt % and fed into a vent type twin-screw extruder. An extruded strand was cut to prepare pellets of ETFE resin (ITO master A1) containing ITO.

(2) Preparation of Hydrotalcite-Based Compound Dispersion Fluororesin (Hydrotalcite Master C1)

A mixture of hydrotalcite-based compound powder which has average particle diameter 20 nm, BET specific surface area 95 m$^2$/g and Chemical Formula [1] and powdered ethylene tetrafluoroethylene copolymer ("NEOFLON (registered trademark)" ETFE EP-546 made by Daikin Industries, Ltd.) was melt-kneaded with a hermetic internal mixer to obtain a composition containing hydrotalcite-based compound powder of 10 wt %. Next, the composition and pellets (ETFE pellets) of ethylene tetrafluoroethylene copolymer ("NEOFLON (registered trademark)" ETFE EP-546 made by Daikin Industries, Ltd.) were blended to contain hydrotalcite-based compound powder of 2 wt % and fed into a vent type twin-screw extruder. An extruded strand was cut to prepare pellets of ETFE resin (hydrotalcite master C1) containing hydrotalcite.

$$Mg^{2+}{}_{1-a}\cdot Al^{3+}{}_{a}(OH^-)_2\cdot AN^{n-}{}_{a/n}\cdot cH_2O \quad [1]$$

where a=0.209, c=0.125, $AN^{n-}$:$CO_3^{2-}$.

(3) Preparation of Blue Pigment Dispersion Fluororesin (Blue Master)

Cobalt blue (FCM H1104 made by Dainichiseika Color & Chemicals Mfg. Co., Ltd.) of average particle diameter 50 nm and powdered ethylene tetrafluoroethylene copolymer ("NEOFLON (registered trademark)" ETFE EP-546 made by Daikin Industries, Ltd.) were melt-kneaded with a hermetic internal mixer to obtain a composition containing cobalt blue of 20 wt %. Next, the composition and the ETFE pellets were blended to contain cobalt blue of 2 wt % and fed into a vent type twin-screw extruder. An extruded strand was cut to prepare pellets of ETFE resin (blue master B1) containing cobalt blue.

(4) The ETFE pellets, ITO master A1 and hydrotalcite master C1 were uniformly blended to be fed into a film formation device provided with single-screw extruder of screw diameter 65 mm, filter, T-die and cooling drum. A film was formed by melt-extrusion to obtain a non-oriented film of thickness 250 μm containing 0.10 wt % ITO and 0.06 wt % hydrotalcite-based compound.

Thus obtained film had high transparency with 88.3% visible light transmittance and a good see-through property enough to see scenery through the film. The film had low near-infrared light transmittance of 42.3% and heat-ray-blocking efficiency of 36.1% with the heat-ray-cutting tester. It had 88.9% of visible light transmittance and 43.4% of near-infrared light transmittance after the weathering test, as keeping the initial characteristic with a good weatherability on transparency and heat-ray blocking Table 1 shows film characteristics of the Examples.

TABLE 1

| | Film thickness [μm] t | 1/t | 200/t | ITO Content [wt %] A | ITO Average particle diameter nm | Hydrotalcite-based compound Content [wt %] 0.03-1.0 | Hydrotalcite-based compound Average particle diameter [nm] | Blue pigment Content [wt %] B | 0.05 A | 0.3 A | Average particle diameter [nm] | Pigment type |
|---|---|---|---|---|---|---|---|---|---|---|---|---|
| Example 1 | 250 | 0.004 | 0.8 | 0.1 | 30 | 0.06 | 20 | 0 | 0.005 | 0.030 | — | — |
| Example 2 | 250 | 0.004 | 0.8 | 0.2 | 30 | 0.06 | 20 | 0 | 0.010 | 0.060 | — | — |
| Example 3 | 100 | 0.010 | 2.0 | 0.25 | 30 | 0.06 | 20 | 0 | 0.013 | 0.075 | — | — |
| Example 4 | 250 | 0.004 | 0.8 | 0.05 | 30 | 0.06 | 20 | 0 | 0.003 | 0.015 | — | — |
| Examples | 50 | 0.020 | 4.0 | 0.1 | 30 | 0.06 | 20 | 0 | 0.005 | 0.030 | — | — |
| Example 6 | 50 | 0.020 | 4.0 | 0.3 | 30 | 0.06 | 20 | 0 | 0.015 | 0.090 | — | — |
| Example 7 | 250 | 0.004 | 0.8 | 1 | 30 | 0.06 | 20 | 0 | 0.050 | 0.300 | — | — |
| Example 8 | 250 | 0.004 | 0.8 | 0.1 | 5 | 0.06 | 20 | 0 | 0.005 | 0.030 | — | — |
| Example 9 | 250 | 0.004 | 0.8 | 0.1 | 50 | 0.06 | 20 | 0 | 0.005 | 0.030 | — | — |
| Example 10 | 250 | 0.004 | 0.8 | 0.1 | 150 | 0.06 | 20 | 0 | 0.005 | 0.030 | — | — |
| Example 11 | 250 | 0.004 | 0.8 | 0.1 | 300 | 0.06 | 20 | 0 | 0.005 | 0.030 | — | — |
| Example 12 | 250 | 0.004 | 0.8 | 0.1 | 30 | 0.30 | 20 | 0 | 0.005 | 0.030 | — | — |
| Example 13 | 250 | 0.004 | 0.8 | 0.1 | 30 | 1.0 | 20 | 0 | 0.005 | 0.030 | — | — |
| Example 14 | 250 | 0.004 | 0.8 | 0.1 | 30 | 0.06 | 10 | 0 | 0.005 | 0.030 | — | — |
| Example 15 | 250 | 0.004 | 0.8 | 0.1 | 30 | 0.06 | 1,000 | 0 | 0.005 | 0.030 | — | — |
| Example 16 | 250 | 0.004 | 0.8 | 0.1 | 30 | 0.06 | 20 | 0.02 | 0.005 | 0.030 | 50 | Cobalt blue |
| Example 17 | 250 | 0.004 | 0.8 | 0.05 | 30 | 0.06 | 20 | 0.015 | 0.003 | 0.015 | 50 | Cobalt blue |
| Example 18 | 250 | 0.004 | 0.8 | 0.30 | 30 | 0.06 | 20 | 0.04 | 0.015 | 0.090 | 50 | Cobalt blue |
| Example 19 | 250 | 0.004 | 0.8 | 0.1 | 30 | 0.06 | 20 | 0.1 | 0.005 | 0.030 | 50 | Cobalt blue |
| Example 20 | 250 | 0.004 | 0.8 | 0.1 | 30 | 0.06 | 20 | 0.04 | 0.005 | 0.030 | 50 | Copper phthalocyanine |
| Comparative Example 1 | 250 | 0.004 | 0.8 | 0 | — | 0 | — | 0 | 0 | 0 | — | — |
| Comparative Example 2 | 250 | 0.004 | 0.8 | 0.1 | 30 | 0 | — | 0 | 0.005 | 0.030 | — | — |
| Comparative Example 3 | 250 | 0.004 | 0.8 | 0.1 | 30 | 0.01 | 20 | 0 | 0.005 | 0.030 | — | — |
| Comparative Example 4 | 250 | 0.004 | 0.8 | 0.1 | 30 | 0.02 | 20 | 0 | 0.005 | 0.030 | — | — |
| Comparative Example 5 | 250 | 0.004 | 0.8 | 0.1 | 30 | 3.0 | 20 | 0 | 0.005 | 0.030 | — | — |

| | Initial characteristics Visible light transmittance [%] $T_v$ | Initial characteristics Near-infrared light transmittance [%] $T_{IR}$ | Initial characteristics Heat-ray-blocking efficiency [%] | Characteristics after accelerated weathering test Visible light transmittance [%] $T_v$ | Characteristics after accelerated weathering test Near-infrared light transmittance [%] $T_{IR}$ | Characteristics after accelerated weathering test Heat-ray-blocking efficiency [%] |
|---|---|---|---|---|---|---|
| Example 1 | 88.3 | 42.3 | 36.1 | 88.9 | 43.4 | 36.3 |
| Example 2 | 86.2 | 23.6 | 45.3 | 87.3 | 25.1 | 43.7 |
| Example 3 | 87.9 | 38.7 | 34.5 | 87.1 | 38.5 | 33.8 |
| Example 4 | 89.1 | 64.7 | 18.9 | 89.3 | 65.1 | 17.6 |
| Examples | 92.6 | 68.6 | 17.3 | 93.7 | 68.9 | 16.9 |
| Example 6 | 88.4 | 48.7 | 31.1 | 89.5 | 49.1 | 30.4 |
| Example 7 | 58.6 | 6.2 | 78.8 | 59.2 | 6.9 | 78.0 |
| Example 8 | 89.7 | 78.6 | 13.6 | 89.8 | 80.8 | 13.2 |
| Example 9 | 86.3 | 39.5 | 38.7 | 87.2 | 41.2 | 35.7 |
| Example 10 | 82.1 | 44.3 | 32.6 | 81.6 | 46.8 | 24.0 |
| Example 11 | 79.3 | 57.4 | 26.5 | 77.7 | 57.4 | 26.5 |
| Example 12 | 87.1 | 41.9 | 36.7 | 88.4 | 42.3 | 36.4 |
| Example 13 | 84.5 | 42.1 | 37.9 | 85.6 | 44.3 | 38.1 |
| Example 14 | 90.2 | 41.4 | 37.7 | 90.9 | 42.3 | 36.3 |
| Example 15 | 83.1 | 40.2 | 40.1 | 84.2 | 40.7 | 39.8 |
| Example 16 | 87.9 | 42.0 | 36.2 | 90.7 | 42.3 | 36.1 |
| Example 17 | 89.7 | 65.8 | 20.8 | 91.0 | 64.7 | 19.8 |
| Example 18 | 82.6 | 17.9 | 56.7 | 82.7 | 18.5 | 54.2 |
| Example 19 | 86.1 | 42.3 | 38.1 | 86.6 | 42.7 | 37.6 |
| Example 20 | 87.9 | 41.9 | 37.2 | 88.1 | 42.9 | 36.9 |
| Comparative Example 1 | 91.7 | 93.5 | 6.9 | 90.2 | 94.1 | 6.4 |
| Comparative Example 2 | 88.3 | 42.3 | 36.1 | 89.2 | 81.3 | 12.2 |
| Comparative Example 3 | 89.2 | 43.0 | 36.3 | 89.7 | 81.3 | 12.5 |

TABLE 1-continued

| | | | | | | |
|---|---|---|---|---|---|---|
| Comparative Example 4 | 88.8 | 42.8 | 36.1 | 89.1 | 80.8 | 13.3 |
| Comparative Example 5 | 78.3 | 42.5 | 37.9 | 79 | 42.8 | 37.0 |

Example 2

Using the same raw materials as Example 1, the ETFE pellets, ITO master A1 and hydrotalcite master C1 were uniformly blended to be fed into a film formation device provided with single-screw extruder of screw diameter 65 mm, filter, T-die and cooling drum. A film was formed by melt-extrusion to obtain a non-oriented film of thickness 250 μm containing 0.2 wt % ITO and 0.06 wt % hydrotalcite-based compound.

Thus obtained film had relatively high transparency with 86.2% visible light transmittance and a good see-through property enough to see scenery through the film. The film had low near-infrared light transmittance of 23.6% and heat-ray-blocking efficiency of 45.3% with the heat-ray-cutting tester.

Example 3

Using the same raw materials as Example 1, the ETFE pellets, ITO master A1 and hydrotalcite master C1 were uniformly blended to be fed into a film formation device provided with single-screw extruder of screw diameter 65 mm, filter, T-die and cooling drum. A film was formed by melt-extrusion to obtain a non-oriented film of thickness 100 μm containing 0.25 wt % ITO and 0.06 wt % hydrotalcite-based compound.

Thus obtained film had a high transparency with 87.9% visible light transmittance and a good see-through property enough to see scenery through the film. The film had low near-infrared light transmittance of 38.7% and heat-ray-blocking efficiency of 34.5% with the heat-ray-cutting tester. The film had 87.1% of visible light transmittance and 38.5% of near-infrared light transmittance after the weathering test, as keeping the initial characteristic with a good weatherability on visible light transmittance and heat-ray blocking.

Example 4

Using the same raw materials as Example 1, the ETFE pellets, ITO master A1 and hydrotalcite master C1 were uniformly blended to be fed into a film formation device provided with single-screw extruder of screw diameter 65 mm, filter, T-die and cooling drum. A film was formed by melt-extrusion to obtain a non-oriented film of thickness 250 μm containing 0.05 wt % ITO and 0.06 wt % hydrotalcite-based compound.

Thus obtained film had very high transparency with 89.1% visible light transmittance and a very good see-through property enough to see scenery through the film. The film had relatively low near-infrared light transmittance of 64.7% and heat-ray-blocking efficiency of 18.9% with the heat-ray-cutting tester. The film had a heat-ray-blocking effect since the ITO content satisfied Formula (1).

Examples 5 and 6

Using the same raw materials as Example 1, the ETFE pellets, ITO master A1 and hydrotalcite master C1 were uniformly blended to be fed into a film formation device provided with single-screw extruder of screw diameter 65 mm, filter, T-die and cooling drum. A film was formed by melt-extrusion to obtain a non-oriented film of thickness 50 μm containing ITO and 0.06 wt % hydrotalcite-based compound.

Example 7

Using the same raw materials as Example 1, the ETFE pellets, ITO master A1 and hydrotalcite master C1 were uniformly blended to be fed into a film formation device provided with single-screw extruder of screw diameter 65 mm, filter, T-die and cooling drum. A film was formed by melt-extrusion to obtain a non-oriented film of thickness 250 μm containing 1.0 wt % ITO and 0.06 wt % hydrotalcite-based compound.

Thus obtained film had low transparency with 58.6% visible light transmittance and a very bad see-through property to see scenery through the film. The film had very low near-infrared light transmittance of 6.2% and heat-ray-blocking efficiency of 78.8% with the heat-ray-cutting tester. The film had a heat-ray-blocking effect and a bad transparency since the ITO content didn't satisfy Formula (1).

Examples 8-11

Using the ETFE raw materials by the same method as Example 1, the ETFE pellets, hydrotalcite master C1 and ITO master dispersing various particle diameters of ITO were uniformly blended to be fed into a film formation device provided with single-screw extruder of screw diameter 65 mm, filter, T-die and cooling drum. A film was formed by melt-extrusion to obtain a non-oriented film of thickness 250 μm containing 1.0 wt % ITO and 0.06 wt % hydrotalcite-based compound.

Thus obtained film kept the characteristics such as visible light transmittance and near-infrared light transmittance even after the weathering test, having a good weatherability on visible light transmittance and heat-ray blocking.

Examples 12 and 13

Using the same raw materials as Example 1, the ETFE pellets, ITO master A1 and hydrotalcite master C1 were uniformly blended to be fed into a film formation device provided with single-screw extruder of screw diameter 65 mm, filter, T-die and cooling drum. A film was formed by melt-extrusion to obtain a non-oriented film of thickness 250 μm containing 0.1 wt % ITO and hydrotalcite-based compound as shown in Table 1.

Thus obtained films kept the initial contents of hydrotalcite-based compound in Examples 12 and 13, having a good weatherability on visible light transmittance and heat-ray blocking.

Examples 14 and 15

Using the ETFE raw materials by the same method as Example 1, the ETFE pellets, ITO master A1 and hydrotalcite master dispersing various particle diameters of hydrotalcite-based compound were uniformly blended to be fed into a film formation device provided with single-screw extruder of screw diameter 65 mm, filter, T-die and cooling drum. A film was formed by melt-extrusion to obtain a non-oriented film of thickness 250 μm containing 0.1 wt % ITO and 0.06 wt % of hydrotalcite-based compound.

Thus obtained films kept the characteristics such as visible light transmittance, near-infrared light transmittance and heat-ray-blocking efficiency even after the weathering test, having a good weatherability on visible light transmittance and heat-ray blocking.

Examples 16-19

Using the same raw materials as Example 1, the ETFE pellets, ITO master A1, blue master B1 and hydrotalcite master C1 were uniformly blended to be fed into a film formation device provided with single-screw extruder of screw diameter 65 mm, filter, T-die and cooling drum. A film was formed by melt-extrusion to obtain a non-oriented film of thickness 250 μm containing 0.06 wt % hydrotalcite-based compound and ITO and blue pigment as shown in Table 1.

Thus obtained films had a high transparency, through which scenery was seen with natural colors derived from the blue pigment. Thus obtained films kept the initial characteristics such as visible light transmittance and near-infrared light transmittance even after the weathering test, having a good weatherability on visible light transmittance and heat-ray blocking without being affected by adding the blue pigment.

Example 20

Using the same raw materials as Example 1, the ETFE pellets, ITO master A1, a blue master and hydrotalcite master C1 were uniformly blended to be fed into a film formation device provided with single-screw extruder of screw diameter 65 mm, filter, T-die and cooling drum. A film was formed by melt-extrusion to obtain a non-oriented film of thickness 250 μm containing 0.1 wt % ITO and 0.06 wt % hydrotalcite-based compound. Although the blue master contained copper phthalocyanine particles as a blue pigment, thus obtained film had a high transparency and a good see-through property enough to see scenery through the film with natural colors like the Example with cobalt blue dispersed as a blue pigment in the film.

Comparative Example 1

A non-oriented film of thickness 250 μm was obtained by the same method except that the ITO master and hydrotalcite master were not contained. As shown in Table 1, thus obtained film had film characteristics such as visible light transmittance of 91.7% and a very good see-through property enough to see scenery through the film. However, the film had high near-infrared light transmittance of 93.5% and poor heat-ray-blocking efficiency of 6.9% with the heat-ray-cutting tester. The film still had high visible light transmittance of 90.2%, high near-infrared transmittance of 94.1% and poor heat-ray-blocking efficiency of 6.4% with the heat-ray-cutting tester after the weathering test.

Comparative Example 2

A non-oriented film of thickness 250 μm was obtained by the same method except that the hydrotalcite master was not contained. The film characteristics are shown in Table 1. Thus obtained film had a high transparency with visible light transmittance of 88.3% and a good see-through property enough to see scenery through the film. The film had low near-infrared light transmittance of 42.4% and poor heat-ray-blocking efficiency of 36.7% with the heat-ray-cutting tester. However, the film had visible light transmittance of 89.2% and near-infrared transmittance of 81.3% after the weathering test, failing to keep the lower initial levels. Therefore, the film had a poor weatherability on heat-ray blocking.

Comparative Examples 3-5

Using the same raw materials as Example 1, the ETFE pellets, ITO master A1, a blue master and hydrotalcite master C1 were uniformly blended to be fed into a film formation device provided with single-screw extruder of screw diameter 65 mm, filter, T-die and cooling drum. A film was formed by melt-extrusion to obtain non-oriented films of thickness 250 μm containing 0.1 wt % ITO as well as 0.005 wt %, 0.020 wt % and 2.000 wt % of hydrotalcite-based compound. Comparative Examples 3 and 4 had a poor effect derived from blended hydrotalcite-based compound, failing to keep the initial levels of visible light transmittance and near-infrared light transmittance after the weathering test. Therefore, the film had poor weatherability. Comparative Example 5 had a great content of hydrotalcite-based compound and kept the initial characteristics like Example 13. However, the film had poor visible light transmittance and high haze of 42.0% relative to 26.5% in Example 13.

INDUSTRIAL APPLICATIONS

Our fluororesin films are excellent in transparency, heat-ray blocking and weatherability in particular, and are applicable to covering material for agricultural houses, roof material for buildings, wall material, various window material, arcade, ceiling domes, carports, vehicle ceiling material and the like, and are applicable to battery surface material and infrared ray-blocking membrane for electronic devices and electric appliances, wherein the utility value can be enhanced with a good visible light transmittance and a high heat-ray-blocking efficiency of 20% or more.

The invention claimed is:

1. A heat-ray-blocking fluororesin film comprising a fluororesin, a heat-ray-blocking metal oxide and a hydrotalcite-based compound having Chemical Formula [1]:

$$Mg^{2+}_{1-a} \cdot Al^{3+}_{a}(OH^-)_2 \cdot AN^{n-}_{a/n} \cdot cH_2O \quad [1]$$

where $0.2 \leq a \leq 0.35$ and $0 \leq c \leq 1$; $AN^{n-}$ indicates n-valent anion and the heat-ray-blocking metal oxide has a content A [wt %] to satisfy Formula (1) with a film thickness t [μm] of 50 to 250 μm:

$$1/t \leq A \leq 200/t \quad (1),$$

wherein content of the hydrotalcite-based compound is 0.06 to 1.0 wt %, the fluororesin is an ethylene tetrafluoroethylene-based copolymer, and the heat-ray-blocking fluororesin film is formed by a melt-extrusion film formation method.

2. The heat-ray-blocking fluororesin film according to claim 1, wherein the heat-ray-blocking metal oxide has an average particle diameter of 5 to 100 nm.

3. The heat-ray-blocking fluororesin film according to claim 1, wherein the hydrotalcite-based compound has an average particle diameter of 10 to 900 nm.

4. The heat-ray-blocking fluororesin film according to claim 1, wherein a light transmittance $T_{IR}$ [%] in wavelength 1800 to 2200 nm satisfies Formula (2):

$$20 \leq T_{IR} \leq 70 \tag{2}.$$

5. The heat-ray-blocking fluororesin film according to claim 1, wherein the heat-ray-blocking metal oxide is a indium tin oxide.

6. The heat-ray-blocking fluororesin film according to claim 2, wherein the hydrotalcite-based compound has an average particle diameter of 10 to 900 nm.

7. The heat-ray-blocking fluororesin film according to claim 2, wherein a light transmittance $T_{IR}$ [%] in wavelength 1800 to 2200 nm satisfies Formula (2):

$$20 \leq T_{IR} \leq 70 \tag{2}.$$

8. The heat-ray-blocking fluororesin film according to claim 3, wherein a light transmittance $T_{IR}$ [%] in wavelength 1800 to 2200 nm satisfies Formula (2):

$$20 \leq T_{IR} \leq 70 \tag{2}.$$

9. The heat-ray-blocking fluororesin film according to claim 2, wherein the heat-ray-blocking metal oxide is a indium tin oxide.

10. The heat-ray-blocking fluororesin film according to claim 3, wherein the heat-ray-blocking metal oxide is a indium tin oxide.

11. The heat-ray-blocking fluororesin film according to claim 4, wherein the heat-ray-blocking metal oxide is a indium tin oxide.

* * * * *